(12) United States Patent
Willuweit

(10) Patent No.: US 6,419,836 B1
(45) Date of Patent: Jul. 16, 2002

(54) COMPOSITION FOR TREATMENT OF WATER AND RECONDITIONING OF SOILS

(75) Inventor: Thomas Willuweit, Hof (DE)

(73) Assignee: Peter Söl (DE)

( * ) Notice: Subject to any disclaimer, the term of this patent is extended or adjusted under 35 U.S.C. 154(b) by 0 days.

(21) Appl. No.: 08/666,534

(22) PCT Filed: Dec. 27, 1994

(86) PCT No.: PCT/EP94/04319

§ 371 (c)(1),
(2), (4) Date: Aug. 30, 1996

(87) PCT Pub. No.: WO95/18070

PCT Pub. Date: Jul. 6, 1995

(30) Foreign Application Priority Data

Dec. 30, 1993 (DE) .......................................... 43 44 926

(51) Int. Cl.⁷ ................................................. C02F 1/52
(52) U.S. Cl. ....................... 210/749; 210/716; 210/724; 210/726; 210/754; 252/175; 252/181; 405/128; 405/263
(58) Field of Search .................. 210/702, 716, 210/723, 724, 726, 749, 752, 754; 252/175, 181; 405/128, 263

(56) References Cited

U.S. PATENT DOCUMENTS 3,450,633 A * 6/1969 Siemers et al. ............. 210/725
3,918,526 A * 11/1975 Hattori et al. ................ 169/51
3,963,637 A * 6/1976 Chappell ..................... 210/726
4,744,904 A * 5/1988 McAninch et al. ......... 210/727
5,008,020 A 4/1991 Surash et al.
5,156,746 A * 10/1992 Maree et al. ................ 210/724
5,431,838 A * 7/1995 Carr et al. .............. 252/174.14

FOREIGN PATENT DOCUMENTS

JP 52144145 12/1977
JP 56091888 7/1981

\* cited by examiner

Primary Examiner—Jay H. Woo
Assistant Examiner—Betsey J. Morrison
(74) Attorney, Agent, or Firm—R.W. Becker & Associates; R. W. Becker

(57) ABSTRACT

A composition for treatment of water and soils comprises components

A. $CaCO_3$,

B. at least one compound selected from the group consisting of calcium salts, including $CaCl_2$ and $Ca(NO_3)_2$, and inorganic magnesium compounds, C. at least one compound selected from the group consisting of $NaHCO_3$ and $KHCO_3$, wherein the components A and B are present in a molar ratio of from 0.1:1 to 1:1, and wherein the components B and C are present in a molar ratio of from 1:3 to 1:1.

15 Claims, No Drawings

COMPOSITION FOR TREATMENT OF WATER AND RECONDITIONING OF SOILS

BACKGROUND OF THE INVENTION

The present invention concerns a composition for treatment of water, especially standing bodies of water and drinking water, for example, drinking water produced by water treatment plants and for reconditioning of acidic soils.

The preparation of drinking water and purification of bodies of water present an ever-increasing problem in an industrial society. Acidification of waters, meaning that the pH value of the water drops as a result of acidic tributaries, acid rain or through the influx of acidic components of the soil, is a well known problem. The natural pH balance of the body of water is disturbed by the low pH, and additionally, heavy metal salts are quite soluble at lower pH, whereby the content of heavy metal salts known to have detrimental effects on living organisms is greatly increased. Moreover, metal water pipes can be dissolved at low pH values. Overall, a drastic reduction or, respectively, a drastic increase in the pH value of waters, especially standing bodies of water, leads to a decrease in the ability of the water to clean and regenerate itself, and finally to a gradual degeneration and death.

A further problem is that acidic waters frequently suffer from an insufficient lime content, a condition which results in further weakening of the biological activity of waters.

Furthermore, drinking water with a pH which is too high, or too low, respectively, and an insufficient content of lime can lead to health problems.

Frequently, drinking water which is prepared by utilization of conventional water treatment facilities does not conform to the standards set by law for pH value, lime content and buffer capacity and thus cannot be released for use by the consumer. According to legal standards, drinking water should have a pH of between 6.5 and 9.5.

Lime, $CaCO_3$, is traditionally used to increase the pH value and lime content of acidic waters. Studies have shown, however, that lime settles as a layer on the bottom of the body of water and, in this form, does not have the desired effect of raising the pH.

In the case of strongly acidic waters, especially those that suffer from having acidic industrial waste waters fed into them, NaOH is used occasionally as well. The addition of NaOH only neutralizes the water, however, and causes no improvement in the water hardness or the buffer capacity so that no real positive stimulation of the water is brought about.

A further means which is used to raise the pH value of waters and/or soils is the use of $Na_2CO_3$, soda. The addition of soda leads to a short-term success. It does not contribute to an increase in hardness. The risk of damage to organism-bearing sediments due to local over-alkalization is great, however.

The object of the present invention is to provide a composition which makes it possible to effect long-term rejuvenation of strongly acidic or, respectively, strongly alkaline waters and soils, especially with respect to providing a stable pH value in the range between 6.5 and 9.5 together with a sufficient hardness.

SUMMARY OF THE INVENTION

The composition for treatment of water and soils according to the present invention is primarily characterized by comprising components:

A. $CaCO_3$,
B. at least one compound selected from the group consisting of calcium salts, including $CaCl_2$ and $Ca(NO_3)_2$, and inorganic magnesium compounds,
C. at least one compound selected from the group consisting of $NaHCO_3$ and $KHCO_3$, wherein the components A and B are present in a molar ratio of from 0.1:1 to 2:1, and wherein the components B and C are present in a molar ratio of from 1:3 to 2:1.

Preferably, the inorganic magnesium compounds include chloride, nitrate, carbonate, oxide, and sulfate, and the calcium salts and inorganic magnesium compounds are used in a molar ratio of from 0.8:1 to 10:1.

The calcium salts and inorganic magnesium compounds are expediently used in a molar ratio of from 1:1 to 6:1.

The components A and B are present in a molar ratio of from 1:1.3 to 1.3:1.

The components A and B are present in a molar ratio of from 1:1.3 to 1:2.

The component C preferably comprises $NaHCO_3$ and $KHCO_3$ in a molar ratio of from 10:1 to 1:1.

The component A further may comprise up to 25 weight-% $MgCO_3$.

The inventive composition may further comprise $Na_2CO_3$ in an amount of up to 20% of a molar amount of the component C.

The present invention also concerns a method for treatment of water to be treated comprising the steps of:

a) dissolving at least one compound selected from the group consisting of calcium salts, including $CaCl_2$ and $Ca(NO_3)_2$, and inorganic magnesium compounds in $H_2O$ to form a first aqueous solution, b) dissolving separately at least one compound selected from the group consisting of $NaHCO_3$ and $KHCO_3$ in $H_2O$ to form a second aqueous solution, c) mixing the first and second aqueous solutions with the water to be treated to form a mixture, and d) passing the mixture of step c) over $CaCO_3$.

Step d) preferably includes the step of providing $CaCO_3$ as a solid bed.

The invention also relates to a method of treating acidic and alkaline water to be treated, including drinking water and standing bodies of water, said method comprising the steps of:

preparing a composition comprising:
A. $CaCO_3$,
B. at least one compound selected from the group consisting of calcium salts, including $CaCl_2$ and $Ca(NO_3)_2$, and inorganic magnesium compounds,
C. at least one compound selected from the group consisting of $NaHCO_3$ and $KHCO_3$,
wherein the components A and B are present in a molar ratio of from 0.1:1 to 2:1, and
wherein the components B and C are present in a molar ratio of from 1:3 to 2:1; and adding the composition to the water to be treated.

The invention also relates to a method of treating soils to be treated, including acidic forest soils, said method comprising the steps of:

preparing a composition comprising:
A. $CaCO_3$,
B. at least one compound selected from the group consisting of calcium salts, including $CaCl_2$ and $Ca(NO_3)_2$, and inorganic magnesium compounds, C. at least one compound selected from the group consisting of $NaHCO_3$ and $KHCO_3$, wherein the components A and B are present in a molar ratio of from 0.1:1 to 2:1, and wherein the components B and C are present in a molar ratio of from 1:3 to 2:1; and adding the composition to the soils to be treated.

DESCRIPTION OF PREFERRED EMBODIMENTS

The present invention thus provides a composition for treatment of water and reconditioning of soils, comprising A. $CaCO_3$, B. $CaCl_2$ and/or $Ca(NO_3)_2$ and, optionally, magnesium salts C. $NaHCO_3$ and, optionally, $KHCO_3$ whereby components A and B are present in a molar ratio of from 0.1:1 to 2:1 and components B and C are present in a molar ratio of from 1:3 to 2:1.

Surprisingly, it has been found that through use of the composition of the present invention in conjunction with waters as well as soils, a stable pH value of between 6.5 and 9.5 is achieved, while at the same time the lime content is increased and a stable buffer capacity is provided. In general, and even in cases of strongly acidified waters, use of the composition of the present invention resulted in a significant increase in the microbiological activity of the water, even after just a few days. This was even more surprising in view of the fact that component B, namely $CaCl_2$ or $Ca(NO_3)_2$ and optional magnesium salts, are themselves acidic when dissolved in water. It was also surprising that use of the composition reduces the pH value of high pH waters and, in spite of this, the water hardness and the buffer capacity with respect to acids increases. It was also determined that metals largely precipitate and that colloidally suspended particles are entrapped in this process as well. Further, it was also observed that aggregates of humic acids were formed, whereby the effect of these acids with respect to mobilization of metals was decreased.

The components of the present invention can all be obtained commercially, the grades or qualities thus available being suitable for the invention. Commercially available calcium salts are obtained from naturally occurring minerals and can contain small amounts of other materials which generally have no influence upon the effectiveness of the composition of the present invention. For example, magnesium salts may also be present, levels of which correspond to that which are present in the naturally occurring source. When the composition is used for treatment of drinking water, grades of components with purities suitable for this purpose are preferred, especially components of analytical quality.

Component A can consist of any commercially available grade of $CaCO_3$. Freshly precipitated $CaCO_3$ has been shown to be especially advantageous. When $CaCO_3$ with a very fine particle size (diameter of about 1 $\mu$m) is used, then very low levels (a mole fraction of from 0.01 to 0.1 with respect to the molar amount of component B) are sufficient. Component A can contain up to 25 weight per cent $MgCO_3$. The content of $MgCO_3$ should not be too high, however, because of the danger of over alkalization, resulting in the set in of decarbonization and subsequent precipitation of lime (water softening). This is diametrically opposed to the purpose of the invention.

Component B can consist of any calcium salt such as calcium chloride or calcium nitrate or mixtures thereof, whereby calcium chloride is preferred. Even if the calcium salts demonstrate an acidic pH value when dissolved in water, the addition of this component results in a stable pH value of between 6.5 and 9.5. The choice of calcium salt is not restricted to special qualities, and thus any commercially available calcium salt can be employed. If the composition of the present invention is used for reconditioning of soils, the following composition has been shown to be particularly advantageous, where B is a mixture of $CaCl_2$, up to 10 weight-% $Ca(NO_3)_2$, and magnesium salts, especially selected from the group consisting of chloride, nitrate, carbonate, oxide and sulfate, whereby the molar ratio of the amounts of calcium salts to magnesium salts can vary in a wide range and is preferably in the range of 0.8:1 to 10:1, especially preferred being 1:1 to 6:1.

The molar ratio of the amounts of components A and B are as a rule 0.1:1 to 2:1, preferably 1:1.3 to 1.3:1. In the case of treatment of alkaline waters, component B is preferably in excess so that the molar ratio preferable in this case is 1:1.3 to 1:2.

The third component of the composition is $NaHCO_3$. Optionally, $KHCO_3$ may also be present as a further component. Commercially available products of any quality may be used in this case. $KHCO_3$ is employed especially when low potassium waters and soils are to be treated. In this case, the molar ratio of $NaHCO_3$ and $KHCO_3$ is in the range of 10:1 to 1:1. Even though $KHCO_3$ can be used in excess, this is not preferred for reasons of cost.

Components B and C are present normally in a molar ratio of 1:3 to 2:1, preferably 1:2.3 to 1:1.7, especially preferred being 1:2.1 to 1:1.9.

The composition of the present invention can contain other common additives which are traditionally used for water treatment and reconditioning of soils.

In instances where strongly acidic waters or soils are to be treated, the composition of the present invention may also contain limited amounts of soda, $Na_2CO_3$. Soda can be added in molar fractions of up to 20% based on the molar amount of component C.

The individual components may be added as a mixture or one after another to the bodies of water or drinking water, respectively, or to the soil. It is, of course, also possible to apply components B and C and, optionally, the soda and then to distribute component A over the surface of the water or soil at a later time.

The composition of the invention can be applied in any manner which is desirable. With smaller bodies of water or smaller soil surfaces, the composition can be distributed by hand. With larger surfaces, mechanical means for distribution, especially means for distributing via the air, have also been shown to be advantageous. For the treatment of drinking water, the composition of the present invention can be added to the water purification process equipment in a practical manner, particularly before any mechanical de-acidification or filtration step which might occur.

The present invention also comprises a process for the treatment of water, characterized in that the steps of the process comprise dissolving components B, $CaCl_2$ and/or $Ca(NO_3)_2$ and optionally magnesium salts, and C, $NaHCO_3$ and optionally $KHCO_3$, separately in water, mixing the solutions with the water to be treated, and passing the solution thus obtained over $CaCO_3$.

In order to preserve the activity of components B and C, it is preferable to mix components A and B in appropriate molar ratios with water to be treated, and then to pass the solution over $CaCO_3$ without long intervening times. In a preferred embodiment, the $CaCO_3$ is in the form of a calcium bed.

It has also been shown to be advantageous to mix the components B and C with the water to be treated in certain molar proportions relative to one another. Preferably, components B and C are present in a molar ratio of from 1:3 to 2:1, preferably from 1:2.3 to 1:1.7, especially preferred being from 1:2.1 to 1:1.9. The amount of $CaCO_3$ utilized while carrying out the process of the present invention is not of significance. The water to be treated, containing components B and C, is passed over the $CaCO_3$. The $CaCO_3$ dissolves in the water to such an extent that an equilibrium is established with the solution, the excess $CaCO_3$ remaining in the form of a solid, for example in the solid bed.

The amount of B and C to be added to the water to be treated can be calculated based on the desired hardness and buffer capacity. When a mixture of 0.2 mol $CaCO_3$:1 mol $CaCl_2$:1.8 mol $NaHCO_3$ was used in the amount of 100 mg mixture per liter water, a hardness increase of 1.3° dH was observed. At the same time, the iron concentration dropped from 2.4 mg/l in the untreated water to 0.08 mg/l in the treated water. Using this particular composition, the conductivity per 100 mg/l increased about 115±10 $\mu$S/cm. The effectiveness of the water hardening based on the sum of calcium and magnesium contained in A and B is dependent upon the condition of the water to be treated.

Depending on need, a treatment using a total of 5–1500 mg/l of the composition is especially appropriate. The most frequently used amounts lie between 50 and 300 mg/l. In general, the minimum amount useful for drinking water is between 100 and 200 mg/l.

Furthermore, the present invention comprises the use of the composition described above for the treatment of acidic and alkaline bodies of water, especially standing bodies of water, which are obtained for example by filtration and employment of traditional water treatment systems. The establishment of the lime—carbon dioxide equilibrium occurs very quickly.

The invention further comprises the use of the composition described above for the reconditioning of soils, especially acidic forest soils.

EXAMPLES

Field experiments have shown that the composition described above provides a long-term pH value of 8.1 when applied to standing bodies of water, namely ponds in city parks and in private gardens.

Additionally, it was shown that already within about three days after the application of the composition of the present invention, a turbidity of the water was observed, indicating an increase in the amount of microbiological activity.

Experiments were carried out using a mixture in the following composition range:

A=0.9, B=2.4, C=6.0 (molar ratio of components), corresponding to: A:B:C=1:2.7:6.7, with C=n($NaHCO_3$)+n($KHCO_3$).

Experimental results are shown in Table 1.

| | Concentration used | | | | | Measured results | | | | | |
|---|---|---|---|---|---|---|---|---|---|---|---|
| | | | | | | Immed. | | Total | pH | pH | pH | Hardness |
| No. | $CaCl_2$ mmol/l | °dH | $NaHCO_3$ mmol/l | $KHCO_3$ mmol/l | $CaCO_3$ mmol/l | hardness mmol/l | °dH | alkalinity mmol/m | after 2 h | after 5 h | after 24 h | 48 h °dH |
| 1 | 2.4 | 13.44 | 6.0 | 0 | 0.9 | 0.99 | 5.5 | 2.9 | 7.58 | 7.62 | 7.90 | 8.1 |
| 2 | 2.4 | 13.44 | 5.4 | 0.6 | 0.9 | 1.06 | 5.9 | 2.96 | 7.56 | 7.61 | 7.91 | 8.3 |
| 3 | 2.4 | 13.44 | 4.8 | 1.2 | 0.9 | 1.09 | 6.1 | 3.01 | 7.52 | 7.59 | 7.88 | 8.4 |
| 4 | 2.4 | 13.44 | 4.2 | 1.8 | 0.9 | 1.15 | 6.4 | 3.27 | 7.56 | 7.57 | 7.83 | 9.1 |
| 5 | 2.4 | 13.44 | 3.6 | 2.4 | 0.9 | 1.16 | 6.5 | 3.43 | 7.53 | 7.58 | 7.87 | 9.6 |
| 6 | 2.4 | 13.44 | 3.o | 3.0 | 0.9 | 1.14 | 6.4 | 3.55 | 7.57 | 7.60 | 7.85 | 9.9 |
| 7 | 2.4 | 13.44 | 2.4 | 3.6 | 0.9 | 1.10 | 6.2 | 3.60 | 7.59 | 7.62 | 7.84 | 10.0 |

The water temperature was 22° C. for all experiments.

Variation in the mole fraction of sodium hydrogen carbonate and potassium hydrogen carbonate, respectively, produced the surprising result that the extent of the immediate hardening of the water was most pronounced at a $KHCO_3$ mole fraction of 2.4. The lower degrees of hardening were unusual as well. While pure calcium chloride gives a hardening directly proportional to the amount dissolved in solution, the composition of the present invention gives only a partial increase in the hardness (immediate effect about 40–110%, based on $CaCl_2$). This partial increase in hardness is in contrast to the total alkalinity of the solution. Surprisingly, it was determined that, in the process of reaching an equilibrium of the lime—carbon dioxide system, there was an initial excess in total alkalinity which quickly fell off in favor of a rising total hardness. Because the increase in the total hardness is in contrast to an equivalent portion of the total alkalinity (filtered solutions!), the water does not demonstrate an increased aggressiveness with respect to metallic materials in the water pipe system due to the treatment (increase in $Cl^-$ concentration) (C. L. Kruse, Korrosion, VCH).

The pH value increases continually in all cases as a function of time. After about 48 hours, the pH value in every instance was 8.2±0.05. A pH value which is constant over time reflects a stable lime—carbon dioxide equilibrium. The opportunity for gas exchange at the solution/air interface increases the rate at which the equilibrium is established.

Even though almost every composition within the composition range described was effective in providing a ΔpH value of less than 0.2 and saturation index of less than 0.2 (measured according to DIN 38404 C10), the mixture of 3 mmol $CaCl_2$, 6 mmol $NaHCO_3$ and 0.6 mmol $CaCO_3$ was especially effective in experiments using $CO_2$-saturated distilled water. The results are shown in the following table:

|  | After | After 24 h | | | |
|---|---|---|---|---|---|
| Initial pH | 1 h pH | pH | c(Ca$^{2+}$) (mmol/l) | KS4.3 (mmol/l) | SI; ΔpH |
| 4.3 | 6.98 | 7.08 | 3.54 | 6.33 | 0.25; 0.16 |

During the course of the experiments, the saturation index SI as well as the ΔpH value rapidly approached the value of 0.10.

Two tons of a mixture of 0.1 mmol CaCO$_3$:1 mmol CaCl$_2$:2 mmol NaHCO$_3$ was distributed over a pond with a surface area of 1.44 ha. The hardness was increased with an effectiveness of 90%, having a corresponding positive effect on the buffering capacity, and the iron content was reduced from about 0.55 mg/l to about 0.15 mg/l.

Experiments with CaCl$_2$—NaHCO$_3$ and CaCl$_2$—KHCO$_3$ systems showed that when component A is not present, the pH value drops continuously with time. These results are shown in the following table 2:

TABLE 2

| c(CaCl$_2$) | c(KHCO$_3$) | pH after 2 h | pH after 5 h | pH after 24 h |
|---|---|---|---|---|
| 2.4 mmol/l | 6 mmol/l | 7.94 | 7.91 | 7.81 |

| c(CaCl$_2$) | c(NaHCO$_3$) | pH after 2 h | pH after 5 h | pH after 24 h |
|---|---|---|---|---|
| 2.4 mmol/l | 6 mmol/l | 7.92 | 7.91 | 7.83 |

Establishment of a equilibrium is facilitated by using freshly precipitated quality of CaCO$_3$. Without addition of this solid phase, comparable equilibrium conditions were not reached.

The present invention is, of course, in no way restricted to the specific disclosure of the specification and drawings, but also encompasses any modifications within the scope of the appended claims.

What is claimed is:

1. A composition for treatment of water and soils for providing a stable pH of between 6.5 to 9.5, increasing the lime content, and providing a stable buffer capacity, said composition consisting of components
    A. CaCO$_3$,
    B. at least one compound selected from the group consisting of calcium salts and inorganic magnesium compounds,
    C. at least one compound selected from the group consisting of NaHCO$_3$ and KHCO$_3$, and
    D. NaCO$_3$ in an amount of 0 to 20% of a molar amount of the component C,
    E. optionally water treatment additives or soil reconditioning additives,
    wherein the components A and B are present in a molar ratio of from 0.1:1 to 2:1, and
    wherein the components B and C are present in a molar ratio of from 1:3 to 2:1.

2. A composition according to claim 1, wherein:
    the inorganic magnesium compounds are selected from the group consisting of chlorides, nitrates, carbonates, oxides, and sulfates; and
    calcium salts and inorganic magnesium compounds are used in a molar ratio of from 0.8:1 to 10:1.

3. A composition according to claim 2, wherein calcium salts and inorganic magnesium compounds are used in a molar ratio of from 1:1 to 6:1.

4. A composition according to claim 1, wherein the components A and B are present in a molar ratio of from 1:1.3 to 1.3:1.

5. A composition according to claim 1, wherein the components A and B are present in a molar ratio of from 1:1.3 to 1:2.

6. A composition according to claim 1, wherein the component C comprises NaHCO$_3$ and KHCO$_3$ in a molar ratio of from 10:1 to 1:1.

7. A composition according to claim 1, wherein the component A further comprises up to 25 weight-% MgCO$_3$.

8. A composition according to claim 1, wherein said calcium salts are CaCl$_2$ and Ca(NO$_3$)$_2$.

9. A method for treating water to provide a stable pH of between 6.5 to 9.5, increase the lime content, and provide a stable buffer capacity, said method comprising the steps of:
    a) dissolving at least one compound selected from the group consisting of calcium salts and inorganic magnesium compounds in H$_2$O to form a first aqueous solution,
    b) dissolving separately at least one compound selected from the group consisting of NaHCO$_3$ and KHCO$_3$ in H$_2$O to form a second aqueous solution,
    c) mixing the first and second aqueous solutions with the water to be treated to form a mixture, and
    d) passing the mixture of step c) over CaCO$_3$.

10. A method according to claim 9, wherein step d) includes the step of providing CaCO$_3$ as a solid bed.

11. A composition according to claim 9, wherein said calcium salts are CaCl$_2$ and Ca(NO$_3$)$_2$.

12. A method of treating acidic and alkaline water for providing a stable pH of between 6.5 to 9.5 increasing the lime content, and providing a stable buffer capacity, said method comprising the steps of:
    preparing a composition consisting of:
        A. CaCO$_3$,
        B. at least one compound selected from the group consisting of calcium salts and inorganic magnesium compounds,
        C. at least one compound selected from the group consisting of NaHCO$_3$ and KHCO$_3$, and
        D. NaCO$_3$ in an amount of 0 to 20% of a molar amount of the component C,
        wherein the components A and B are present in a molar ratio of from 0.1:1 to 2:1, and
        wherein the components B and C are present in a molar ratio of from 1:3 to 2:1;
    adding the composition to the water to be treated; and
    optionally adding water treatment additives or soil reconditioning additives.

13. A composition according to claim 12, wherein said calcium salts are CaCl$_2$ and Ca(NO$_3$)$_2$.

14. A method of treating soils for providing a stable pH of between 6.5 to 9.5, increasing the lime content, and providing a stable buffer capacity, said method comprising the steps of:
    preparing a composition consisting of:
        A. CaCO$_3$,
        B. at least one compound selected from the group consisting of calcium salts and inorganic magnesium compounds, C. at least one compound selected from the group consisting of $NaHCO_3$ and $KHCO_3$, and D. $NaCO_3$ in an amount of 0 to 20% of a molar amount of the component C, wherein the components A and B are present in a molar ratio of from 0.1:1 to 2:1, and wherein the components B and C are present in a molar ratio of from 1:3 to 2:1;

adding the composition to the soils to be treated; and optionally adding water treatment additives or soil reconditioning additives.

15. A composition according to claim 14, wherein said calcium salts are $CaCl_2$ and $Ca(NO_3)_2$.

* * * * *

UNITED STATES PATENT AND TRADEMARK OFFICE
CERTIFICATE OF CORRECTION

PATENT NO.   : 6,419,836 B1
DATED        : July 16, 2002
INVENTOR(S)  : Willuweit It is certified that error appears in the above-identified patent and that said Letters Patent is hereby corrected as shown below:

<u>Title page,</u>
Item [73], should read as follows:
-- [73] Assignee:  Peter Söll (DE) --

Item [57], should read follows:
-- [57] ABSTRACT:
A composition for treatment of water and soils comprises components A. $CaCO_3$,
B. at least one compound selected from the group consisting of calcium salts, including $CaCl_2$ and $Ca(NO_3)_2$, and inorganic magnesium compounds,
C. at least one compound selected from the group consisting of $NaHCO_3$ and $KHCO_3$, wherein the components A and B are present in a molar ratio of from 0.1:1 to 2:1, and wherein the components B and C are present in a molar ratio of from 1:3 to 2:1. --

Signed and Sealed this

Fifth Day of November, 2002

*Attest:*

*Attesting Officer*

JAMES E. ROGAN
*Director of the United States Patent and Trademark Office*